United States Patent
English et al.

(10) Patent No.: US 7,882,304 B2
(45) Date of Patent: *Feb. 1, 2011

(54) SYSTEM AND METHOD FOR EFFICIENT UPDATES OF SEQUENTIAL BLOCK STORAGE

(75) Inventors: Robert M. English, Sunnyvale, CA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 11/927,952

(22) Filed: Oct. 30, 2007

(65) Prior Publication Data

US 2009/0034377 A1 Feb. 5, 2009

Related U.S. Application Data

(63) Continuation-in-part of application No. 11/741,553, filed on Apr. 27, 2007.

(51) Int. Cl.
*G06F 12/12* (2006.01)
(52) U.S. Cl. .................... 711/113; 369/47.13; 711/159; 711/E12.069
(58) Field of Classification Search ........................ None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |

(Continued)

FOREIGN PATENT DOCUMENTS

EP 0 617 358 A 9/1994

(Continued)

OTHER PUBLICATIONS

"Notification of Transmittal of the International Search Report and the Written Opinion of the International Searching Authority, or the Declaraion", International Application No. PCT/US2008/011502, filed on Oct. 6, 2008, Mailing Date Jan. 15, 2009, 11 pages.

(Continued)

*Primary Examiner*—Reginald G Bragdon
*Assistant Examiner*—Eric Loonan
(74) *Attorney, Agent, or Firm*—Cesari and McKenna, LLP (57) ABSTRACT

An improved system and method enhances performance of updates to sequential block storage of a storage system. A disk-based sort procedure is provided to establish locality among updates (write data) held in a disk-based log, thereby enabling the write data to be efficiently written to home locations on a home location array. As the write data is received, a log manager of the storage system temporarily stores the data efficiently on the disk-based log. As more write data arrives, the log manager sorts the data in the log in accordance with the sort procedure, thus increasing the locality of data when stored on the home location array. When the log approaches capacity, the log manager writes the sorted data to their home locations on the array with high locality and performance.

19 Claims, 10 Drawing Sheets

U.S. PATENT DOCUMENTS

| | | | |
|---|---|---|---|
| 4,698,808 | A | 10/1987 | Ishii |
| 4,761,785 | A | 8/1988 | Clark et al. |
| 4,805,090 | A | 2/1989 | Coogan |
| 4,837,675 | A | 6/1989 | Bean et al. |
| 4,843,541 | A | 6/1989 | Bean et al. |
| 4,864,497 | A | 9/1989 | Lowry et al. |
| 4,896,259 | A | 1/1990 | Jacobs et al. |
| 4,899,342 | A | 2/1990 | Potter et al. |
| 4,916,608 | A | 4/1990 | Shultz |
| 4,989,206 | A | 1/1991 | Dunphy, Jr. et al. |
| 5,124,987 | A | 6/1992 | Milligan et al. |
| 5,129,088 | A | 7/1992 | Auslander et al. |
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,426,747 | A | 6/1995 | Weinreb et al. |
| 5,432,922 | A * | 7/1995 | Polyzois et al. ................. 714/6 |
| 5,485,579 | A | 1/1996 | Hitz et al. |
| 5,511,177 | A | 4/1996 | Kagimasa et al. |
| 5,557,770 | A * | 9/1996 | Bhide et al. ................. 711/161 |
| 5,568,629 | A | 10/1996 | Gentry et al. |
| 5,570,332 | A * | 10/1996 | Heath et al. ................. 369/30.1 |
| 5,581,724 | A | 12/1996 | Belsan et al. |
| 5,764,972 | A | 6/1998 | Crouse et al. |
| 5,802,366 | A | 9/1998 | Row et al. |
| 5,819,292 | A | 10/1998 | Hitz et al. |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,061,770 | A | 5/2000 | Franklin |
| 6,081,875 | A | 6/2000 | Clifton et al. |
| 6,128,627 | A | 10/2000 | Mattis et al. |
| 6,148,368 | A | 11/2000 | DeKoning |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 | 5/2001 | Schneider et al. |
| 6,341,341 | B1 | 1/2002 | Grummon et al. |
| 6,397,311 | B1 | 5/2002 | Capps et al. |
| 6,457,021 | B1 | 9/2002 | Berkowitz et al. |
| 6,516,380 | B2 | 2/2003 | Kenchammana-Hoskote et al. |
| 6,571,261 | B1 | 5/2003 | Wang-Knop et al. |
| 6,571,298 | B1 * | 5/2003 | Megiddo ................. 710/5 |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,721,764 | B2 | 4/2004 | Hitz et al. |
| 6,732,124 | B1 | 5/2004 | Koseki et al. |
| 6,804,706 | B2 | 10/2004 | Pitts |
| 6,868,417 | B2 | 3/2005 | Kazar et al. |
| 6,978,283 | B1 | 12/2005 | Edwards et al. |
| 6,993,701 | B2 | 1/2006 | Corbett et al. |
| 7,038,058 | B2 | 5/2006 | Rust et al. |
| 7,127,577 | B2 | 10/2006 | Koning et al. |
| 7,194,597 | B2 | 3/2007 | Willis et al. |
| 7,231,412 | B2 | 6/2007 | Hitz et al. |
| 7,409,494 | B2 | 8/2008 | Edwards et al. |
| 7,590,807 | B2 | 9/2009 | McGovern et al. |
| 2004/0030668 | A1 | 2/2004 | Pawlowski et al. |
| 2004/0128470 | A1 | 7/2004 | Hetzler et al. |
| 2006/0184587 | A1 | 8/2006 | Federwisch et al. |
| 2007/0088702 | A1 | 4/2007 | Fridella et al. |

FOREIGN PATENT DOCUMENTS

| | | |
|---|---|---|
| WO | WO-02/29575 A2 | 4/2002 |
| WO | WO2008/133812 | 11/2008 |
| WO | WO2009/058189 | 5/2009 |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Lorie, Raymond, A, Physical Integrity in a large segmented database, ACM Trans. Database Systems, 2(1):91-104, Mar. 1977.

Lorie, Ra, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective On The Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley, 26 pages, Dec. 1987.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Rosenblum, Mendel, et al. The Design and Implementation of a Log-Structured File System Jul. 24, 1991 pp. 1-15.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, Apr. 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition, 37 pages, Sep. 1991.

"Notification of Transmittal of the International Search Report and the Written Opinion of the International Searching Authority, or the Declaration," International Filing Date: Apr. 14, 2008, International Application No. PCT/US2008/004763, Applicant: Network Applicance, Inc., Date of Mailing: Aug. 1, 2008, pp. 1-12.

U.S. Appl. No. 11/741,553, entitled System and Method for Efficient Updates of Sequential Block Storage, filed Apr. 27, 2007, by Robert M. English, 36 pages.

Auspex Systems, LFS—A Local File System for Multiprocessor NFS Network Servers, 1994, 6 pages.

Chutani, Sailesh, et al., The Episode File System, In Proceedings of the USENIX Winter 1992, 18 pages.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages. 1988.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, The Design and Implementation of a Log-Structured File System, 1992, pp. 1-93.

Satyanarayanan, M., et al., Coda: A highly available file system for a distributed workstation environment Carnegie Mellon University, CMU-ITC, 1990, 5 pages.

Sidebotham, Bob, Volumes: The Andrew File System Data Structuring Primitive, EEUG Conference Proceedings, Manchester, UK, Autumn 1986.

* cited by examiner

SYSTEM AND METHOD FOR EFFICIENT UPDATES OF SEQUENTIAL BLOCK STORAGE

CROSS-REFERENCE TO RELATED APPLICATION

The present invention is a continuation-in-part of U.S. patent application Ser. No. 11/741,553 titled, System and Method for Efficient Updates of Sequential Block Storage, filed Apr. 27, 2007.

FIELD OF THE INVENTION

The present invention relates to storage systems and, more specifically, to enhancing performance of updates to sequential block storage of a storage system.

BACKGROUND OF THE INVENTION

Disks, by their nature, are more efficient at sequential, localized transfers than at small, random transfers. A constant challenge in the disk storage industry is to develop a system, e.g., a storage system, which can perform both random write operations and sequential read operations, efficiently. As used herein, a storage system is a computer that provides storage services relating to the organization of information on writeable persistent storage, such as non-volatile memories and disks. The storage system may include a storage operating system that implements a virtualization system to logically organize the information as a hierarchical structure of data containers, such as files and logical units (luns), on, e.g., one or more arrays of disks. Each "on-disk" data container may be implemented as set of data structures, e.g., disk blocks, configured to store information, such as the actual data for the container.

The virtualization system of the storage system may be abstracted through the use of a database management system, a volume manager or a file system. A conventional log-structured file system such as, e.g., a write anywhere file system, can convert a random stream of write operations, e.g., write data, into sequential disk transfers, but in the process, can randomize locations of blocks on disk and make subsequent sequential read operations generally inefficient. On the other hand, a conventional disk array approach, such as a standard Redundant Array of Independent (or Inexpensive) Disks (RAID), typically employs a static layout that maps externally-received, sequential addresses into sequential locations on disk. This approach provides good sequential read performance, but poor random write performance.

Conventional disk array systems often compensate for poor write performance by implementing large write buffers. These write buffers are typically implemented in non-volatile memory, given its persistency and ability to maintain write data (updates) in light of a system failure. With sufficiently large write buffers, these systems can achieve higher performance by optimizing the sequence of disk updates across a large pool of potential write "candidates". However, the relative expense of maintaining large write buffers and protecting them against data loss due to system or power failures limits the size of the buffers and the efficiency gains that can be achieved.

SUMMARY OF THE INVENTION

The present invention overcomes the disadvantages of the prior art by providing an improved system and method for enhancing performance of updates to sequential block storage of a storage system. A disk-based sort procedure is provided to establish locality among updates (write data) held in a disk-based log, thereby enabling the write data to be efficiently written to home locations on a home location array. As the write data is received, a log manager of the storage system temporarily stores the data efficiently on the disk-based log. As more write data arrives, the log manager sorts the data in the log in accordance with the sort procedure, thus increasing the locality of data when stored on the home location array. When the log approaches capacity, the log manager writes the sorted data to their home locations on the array with high locality and performance.

In an illustrative embodiment described herein, the home location array comprises a disk array having a plurality of disks, each of which is partitioned into disjoint segments. Segments on different disks are organized into stripes and stripes adjacent to one another are organized into zones. The present invention provides a single level sort procedure that achieves locality by sorting the write data for storage onto zones (rather than stripes) of the home location array. Advantageously, the disk-based sorting procedure reduces resource consumption in the storage system, while substantially improving locality of disk access and, therefore, disk update performance efficiency compared to conventional static disk arrays.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides an improved system and method for enhancing performance of updates to sequential block storage of a storage system. Illustratively, the present invention provides a staged, logging and sorting mechanism to improve write updates.

Figure 1:
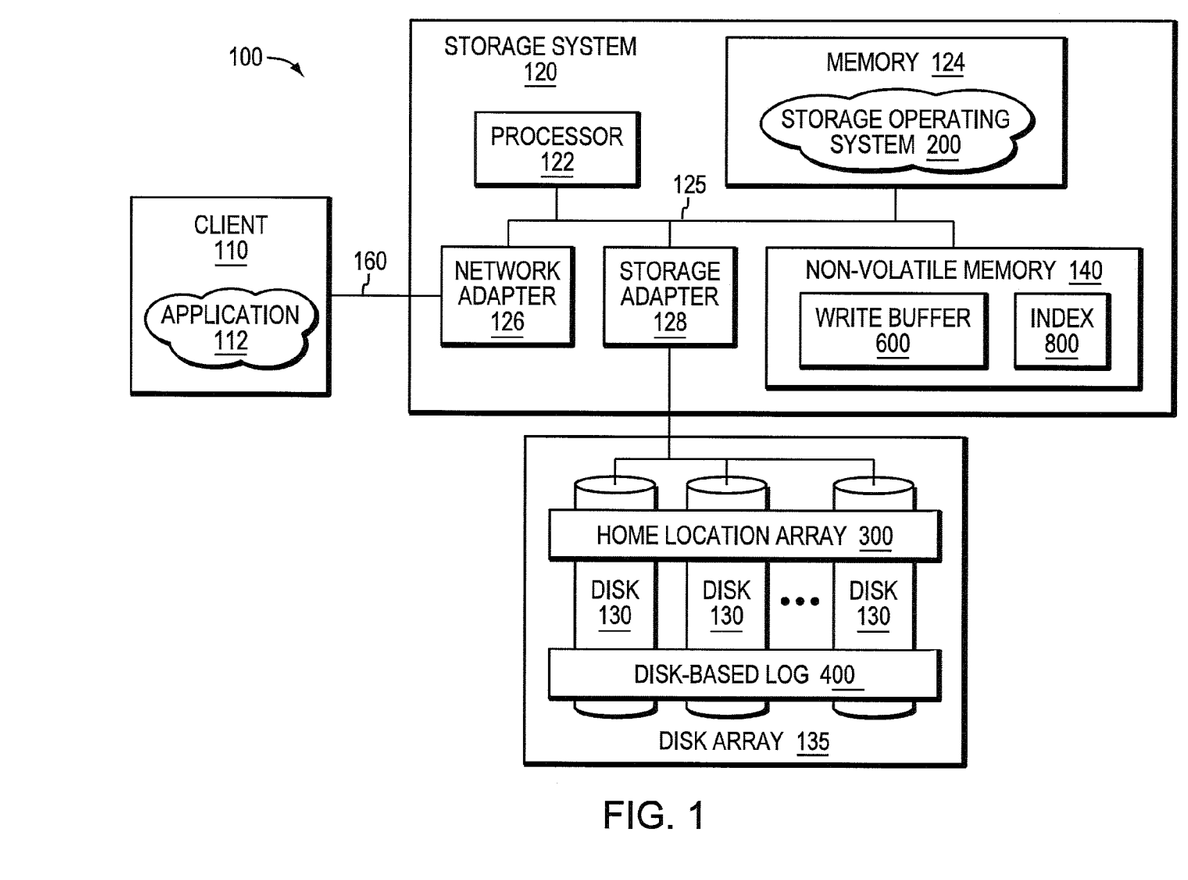
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable persistent storage devices, such as disks 130 of disk array 135. To that end, the storage system 120 comprises a processor 122, a memory 124, a network adapter 126, a storage adapter 128 and non-volatile memory 140 interconnected by a system bus 125. The storage system 120 also includes a storage operating system 200 that implements a virtualization system to logically organize the information as a hierarchical structure of data containers, such as files and logical units (luns), on the disks 130.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which is typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the inventive technique described herein.

Figure 6:
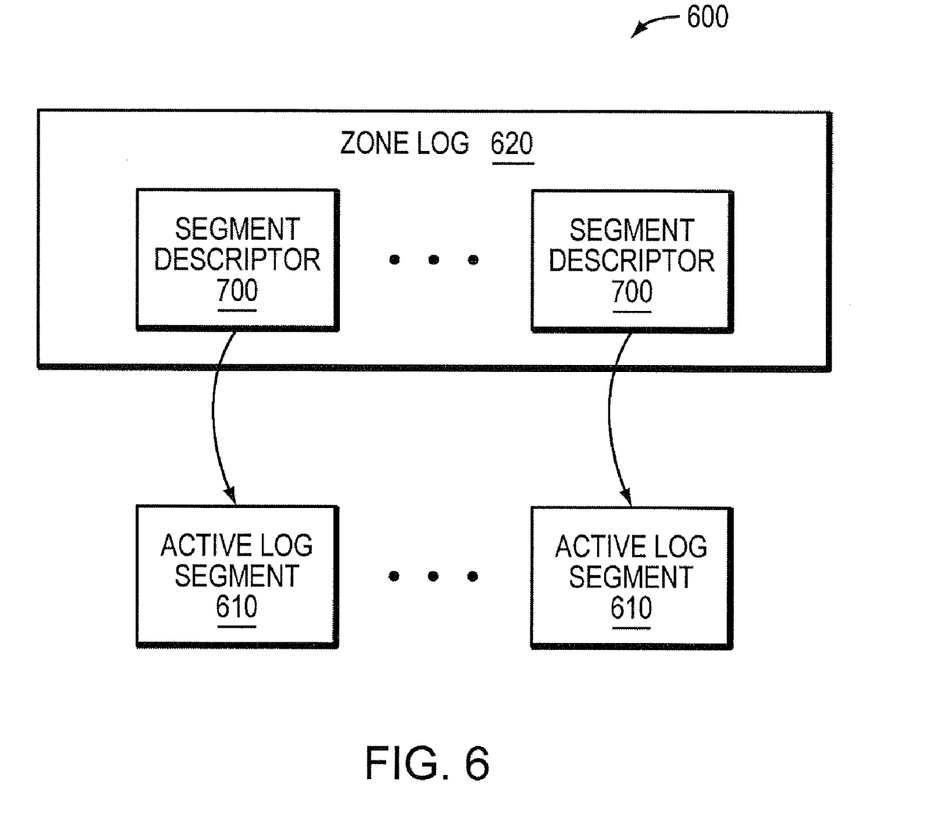
FIG. 6 is a schematic block diagram illustrating organization of a write buffer that may be advantageously used with the present invention.
Figure 8:
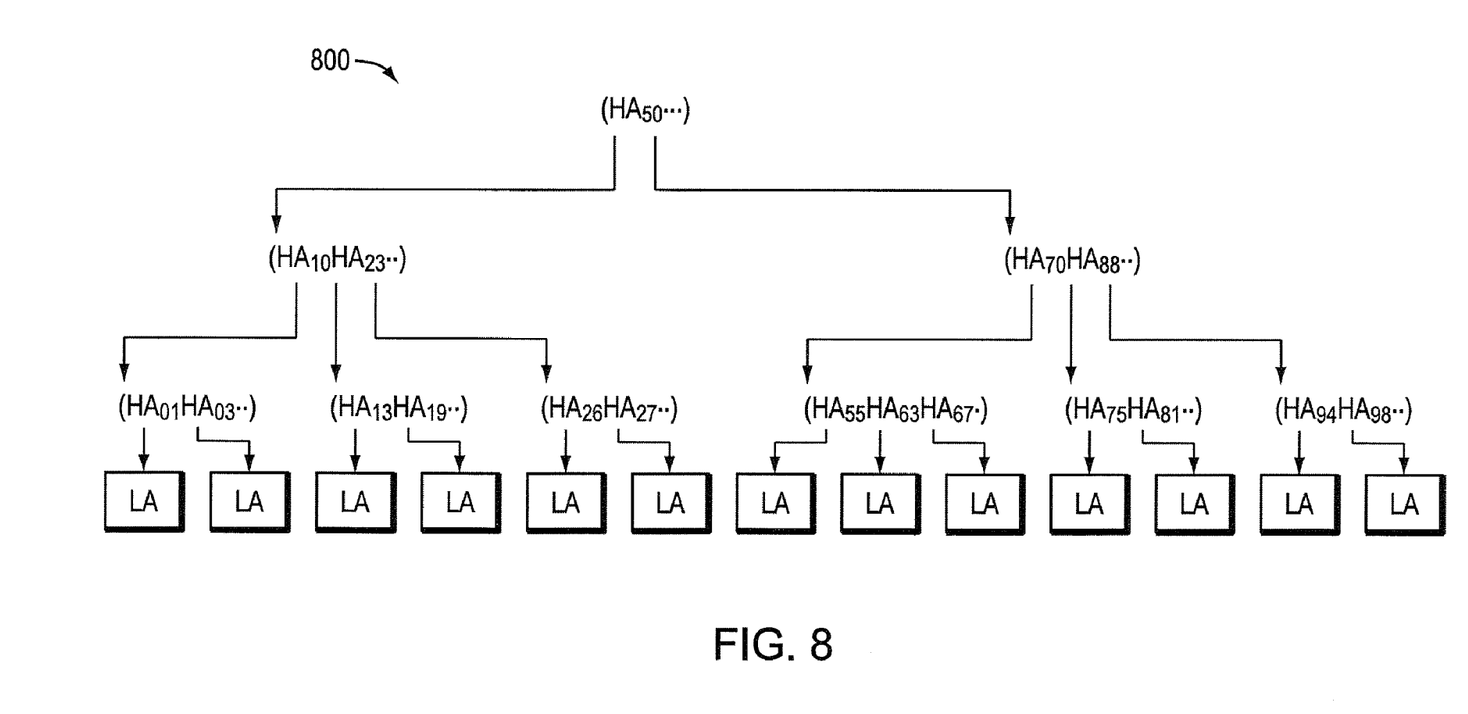
FIG. 8 is a schematic block diagram illustrating organization of an index that may be advantageously used with the present invention.

The non-volatile memory 140 provides a temporary, yet persistent, storage space capable of maintaining write data (updates) in light of a failure to the storage system. Accordingly, the non-volatile memory 140 may be embodied as a large-volume, solid-state random access memory array having either a back-up battery, or other built-in last-state-retention capabilities (e.g. a FLASH memory), that holds the last state of the memory in the event of any power loss to the array. As described herein, the non-volatile memory is organized as a write buffer 600 and an index 800.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or Network File System (NFS) protocol, over TCP/IP when accessing information in the form of files. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

The storage adapter 128 cooperates with the storage operating system 200 executing on the storage system to access information requested by the client. The information may be stored on the disks 130 of the disk array 135 or other similar media adapted to store information. The storage adapter includes input/output (I/O) interface circuitry that couples to the disks 130 over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into a packet and returned to the client 110.

Figure 3:
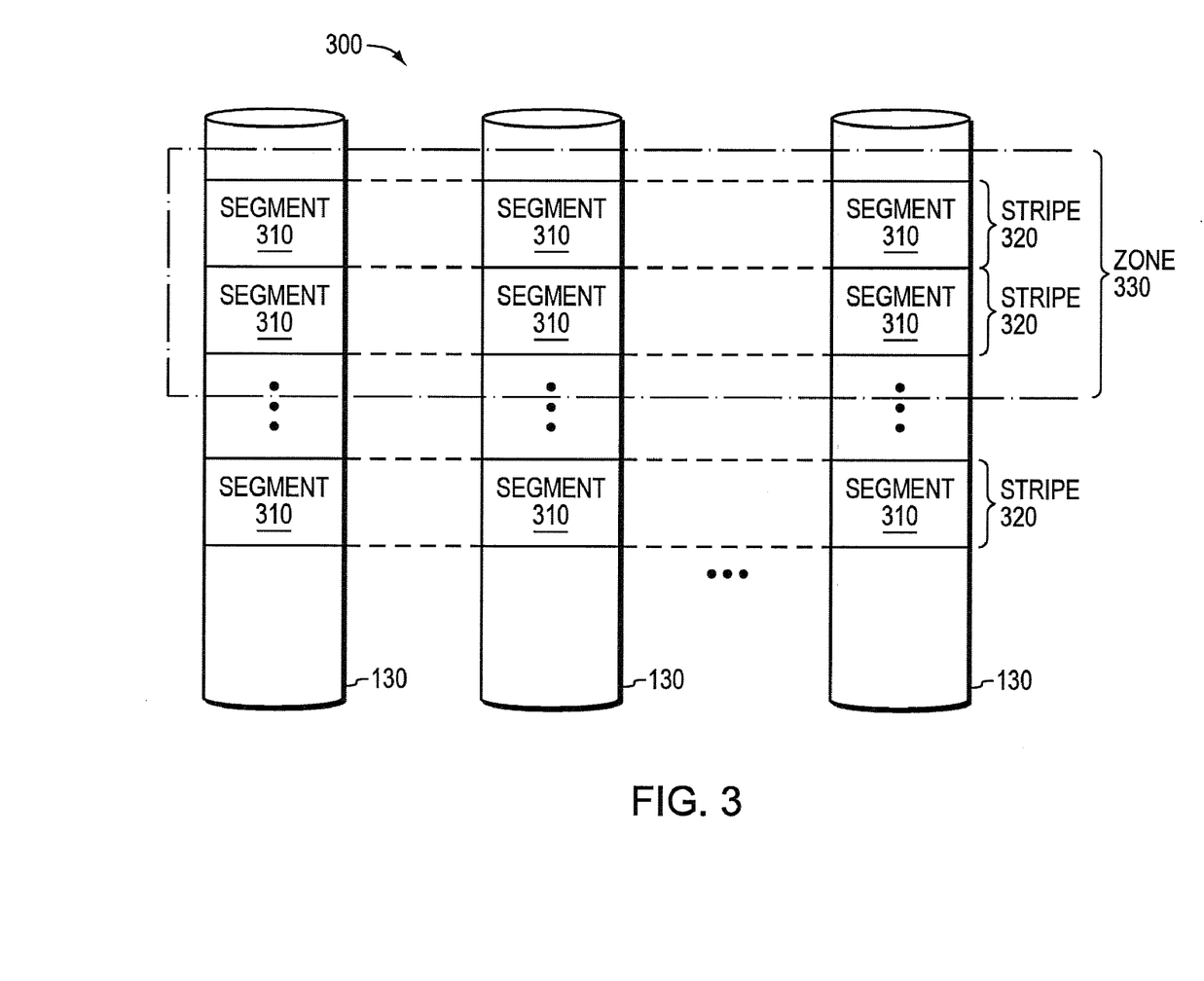
FIG. 3 is a schematic block diagram illustrating organization of a home location array that may be advantageously used with the present invention.
Figure 4:
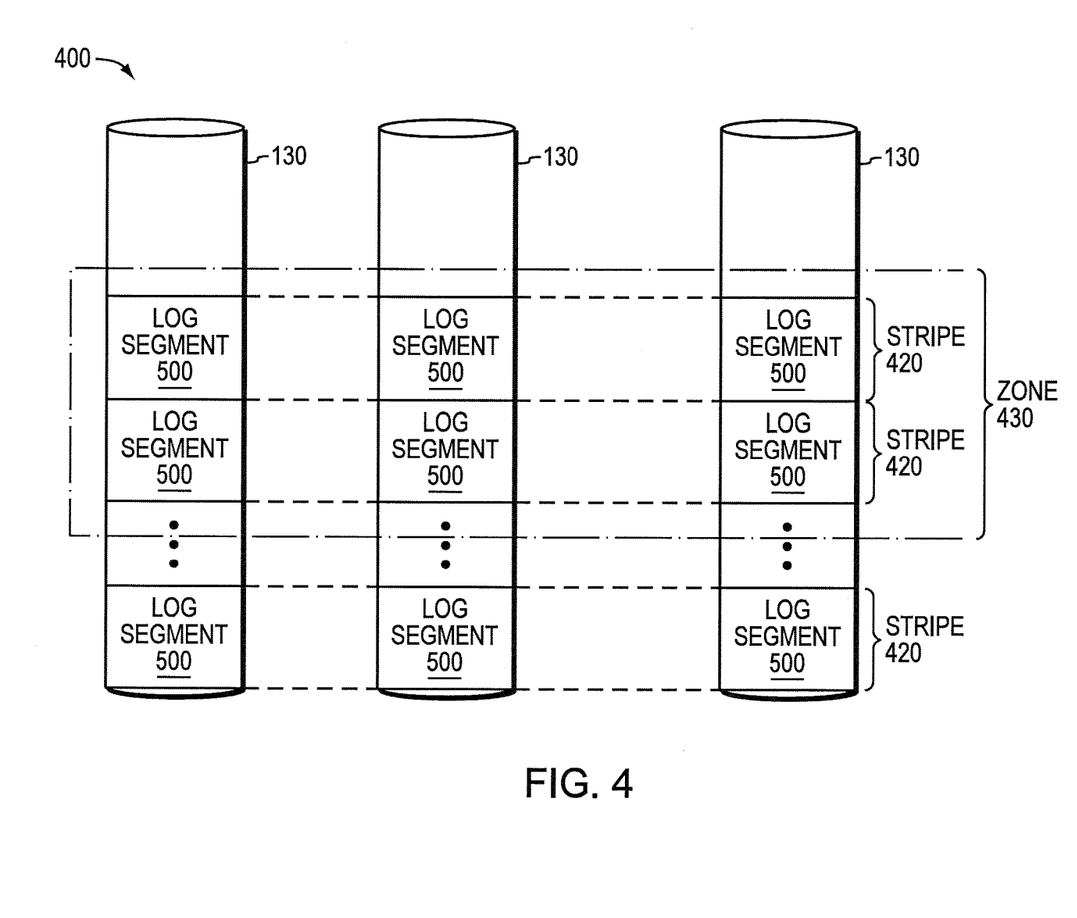
FIG. 4 is a schematic block diagram illustrating organization of a disk-based log that may be advantageously used with the present invention.

In an illustrative embodiment described herein, the disk array 135 is organized into a home location array 300 and a disk-based log 400. The disks 130 of the array are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-5 level implementation, although it should be understood that other types and levels of RAID implementations, as well as other forms of redundancy, may be used in accordance with the inventive principles described herein.

Figure 2:
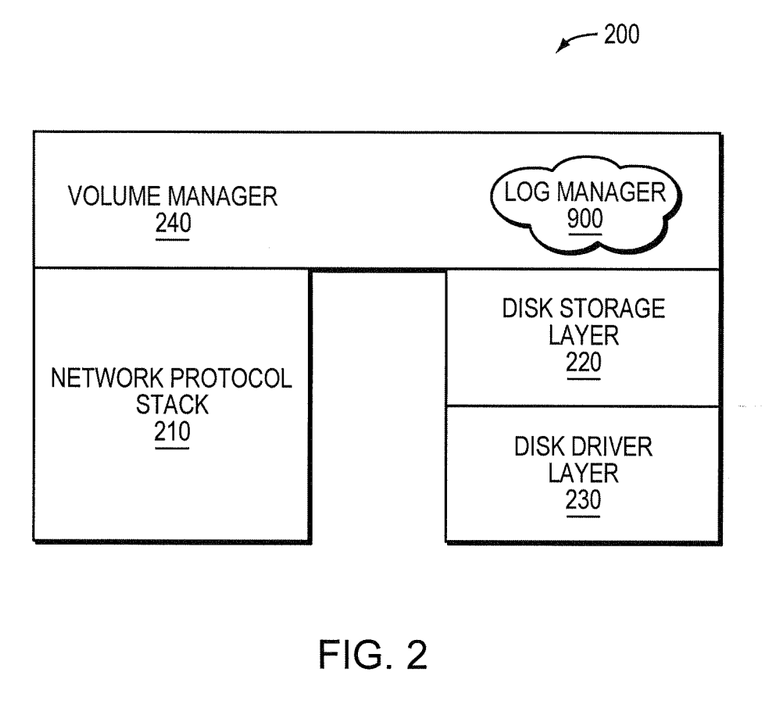
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 210. In addition, the storage operating system 200 includes a disk storage layer 220 that implements a disk storage protocol, such as a RAID protocol, and a disk driver layer 230 that implements a disk access protocol such as, e.g., a Small Computer Systems Interface (SCSI) protocol. Note that the disk storage layer 220 may alternatively be implemented as a RAID system module and embodied as a separate hardware component, such as a disk controller.

Bridging the disk software layers with the network and file system protocol layers is a virtualization system that may be abstracted through the use of a database management system, a file system or, as described herein, a volume manager 240. The volume manager 240 is illustratively a message-based system that provides logical volume management capabilities for use in access to the information stored on the storage devices, such as non-volatile memory 140 and disks 130. That is, the volume manger 240 provides functions such as (i) aggregation of the disks, (ii) aggregation of storage bandwidth of the disks, and (iii) reliability guarantees, such as mirroring and/or parity (RAID).

A log manager 900 is configured to implement an improved sort procedure described herein and, to that end, is further configured to manage the disk-based log 400, as well as the temporary, persistent storage space of the non-volatile memory 140 in accordance with the present invention. In an illustrative embodiment, the log manager 900 is embodied as a process of the volume manager 240, although it will be apparent to those skilled in the art that the log manager 900 can be implemented as a process of the disk driver layer 230, an application program, or any other specialized log management software of the storage operating system 200.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

In an illustrative embodiment described herein, disk array 135 of the storage system 120 is utilized to extend write buffers 600 of the system, thereby rendering a portion of the disk array the disk-based log 400. To that end, one portion of the disk array is organized into a home location array 300 having a set of sequential home locations for disk blocks. Another portion of the disk array is organized into the disk-based log 400 having a set of log buffers configured to store versions of disk blocks that have yet to be returned to their home locations in the home location array. In addition, non-volatile memory 140 of the storage system is organized as an index 800 configured to provide efficient mappings of disk blocks not yet returned to their home locations. That is, the non-volatile memory index provides mappings from home addresses on the home location array to log buffer addresses on the disk-based log.

Home Location Array

FIG. 3 is a schematic block diagram illustrating organization of the home location array 300 that may be advantageously used with the present invention. Each disk 130 of disk array 135 is partitioned into disjoint (i.e., non-overlapping) segments 310, with each segment containing a sequence of disk addresses. It is advantageous for size of the segment to be close to the size of the underlying disk track. The disk addresses are illustratively 32-bit integers and each disk address illustratively corresponds to 4 kB of disk storage. However, it will be understood to those of skill in the art that other disk address and block storage sizes may be used herein.

The home location segments 310 on different disks 130 are organized into stripes 320, with each stripe containing a sequence of disk addresses. Note that the addresses of the segments 310 forming a stripe 320 do not have to assume the same positional locations on each disk 130, e.g., as in the case of a horizontal stripe, although such an arrangement is simpler to organize than, e.g., a diagonal stripe. However, the segment addresses of a stripe are configured to share parity or redundancy information. That is, each stripe has associated redundancy information, parity in the case of a RAID array or redundant copies in the case of mirroring.

Stripes 320 adjacent to one another on disks 130 are organized into zones 330. Because the disk addresses within the segments 310 in each zone are dense, locality of disk address implies close physical locality and enables efficient data transfer. Note that, as a result of the disk-based sort procedure within the log (as described further herein), logged blocks are close together in their addresses when the time comes to write them back to their home locations. Those blocks are thereafter written back to their home locations on disk as sets of blocks that have their home locations on the same stripe. In an illustrative embodiment, the log is large enough to contain multiple blocks to be written to each segment in the stripe; accordingly, the cost of writing the blocks to each segment in the stripe, as well as the updates to the RAID parity information in each stripe, is reasonable and efficient. The sets of blocks to be written may span stripes 320 but are preferably within a small number of stripes 320.

Disk-Based Log

FIG. 4 is a schematic block diagram illustrating organization of the disk-based log 400 that may be advantageously used with the invention. As noted, a portion of the disk array 135 is organized as the log 400. In an illustrative embodiment, the log consumes approximately 5% of the disk array 135, although other percentages of log consumption may be advantageously used with the present invention. Moreover, as noted, it is advantageous that the log be large enough to accommodate multiple blocks for each segment in the home array 300. It should be further noted that log consumption will typically not be limited by the cost of disk storage space, but by the cost of maintaining the index 800 used to describe the log.

The disk-based log 400 illustratively incorporates a segment/stripe/zone topology similar to that of the home location array 300. That is, each disk 130 of the log 400 is partitioned into disjoint log segments 500, wherein log segments on different disks 130 are organized into stripes 420 and wherein stripes 420 adjacent to one another are organized into zones 430. Note also that the log 400 does not necessarily reside on a lower portion of the disk array 135, but may reside on another portion of the array 135 and, alternatively, may even be interspersed among the zones 330 of the home location array 300. Furthermore, the disk-based log 400 may reside on another disk or set of disks, or another type of storage.

Figure 5:
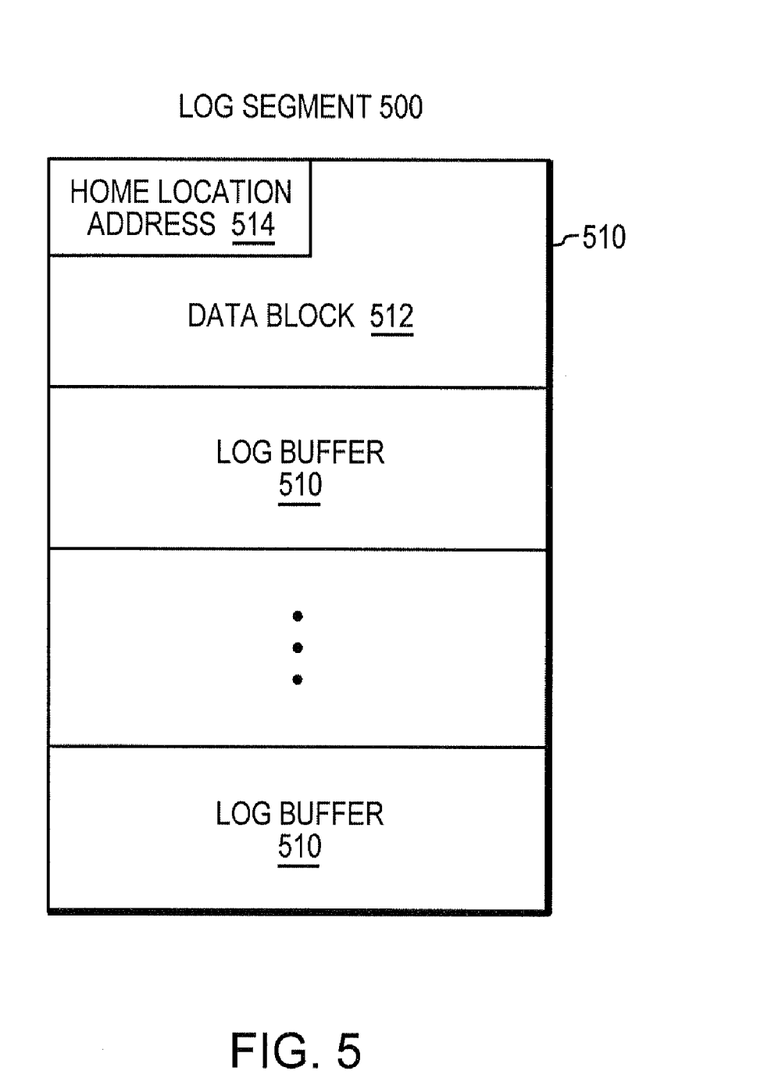
FIG. 5 is a schematic block diagram illustrating organization of a log segment that may be advantageously used with the present invention.

FIG. 5 is a schematic block diagram illustrating organization of a log segment 500 that may be advantageously used with the present invention. In an illustrative embodiment, each log segment 500 resides on a disk 130 and comprises a set of log buffers, e.g., 64 log buffers 510, wherein each log buffer comprises a data block 512 and a corresponding address 514. That is, each log buffer 510 stores a 4 kB block of data (data block 512) that is associated with a 32-bit home location address 514.

As used herein, a "homed" data block is a data block that is stored in the home location array 300. A "logged" data block is a data block that is stored in the disk-based log 400 and whose data has not yet been moved back to its home block location in the home location array. Thus, each log segment 500 contains a set of logged data blocks 512 with known locality. For example, a write request that updates a homed data block with a new write data block is a logged data block in the log until that data block is moved to the home location array. The index 800 reflects that there is an update to the homed data block that is held in the log 400 so that, if a subsequent read request is directed to that data block, the read request is serviced from the disk-based log 400 instead of the home location array 300. A logged data block could also be a new data block that has yet to be written to its home block location in the array.

Write Buffer

As also used herein, an active log segment is an "in core" (in memory) representation of a log segment 500 that is actively written by the log manager 900 for updates (write data) of incoming write requests received at the storage system 120. As a result, each active log segment illustratively comprises 64 log buffers, wherein each log buffer includes a 4 kB block of data. These active log segments are generally pre-assigned to locations in the disk-based log 400, i.e., have corresponding log segment addresses. The active log segments illustratively reside in an intermediate staging area of the storage system that is embodied as write buffer 600.

FIG. 6 is a schematic block diagram illustrating the organization of the write buffer 600 that may be advantageously used with the present invention. In an illustrative embodiment, the write buffer 600 is organized into memory data structures that are used by the log manager 900 to manage the disk-based log 400. Each memory data structure functions as a segment descriptor 700 that references (points to) an active log segment 610 created in the write buffer 600 and that represents a corresponding log segment 500 of the log 400. A plurality of segment descriptors 700 is organized as a zone log 620 that, according to the invention, identifies all log segments that share a particular zone. Notably, a zone should be large enough so there are not so many associated zone logs that at least one active log segment per zone can be held in the write buffer 600.

Figure 7:
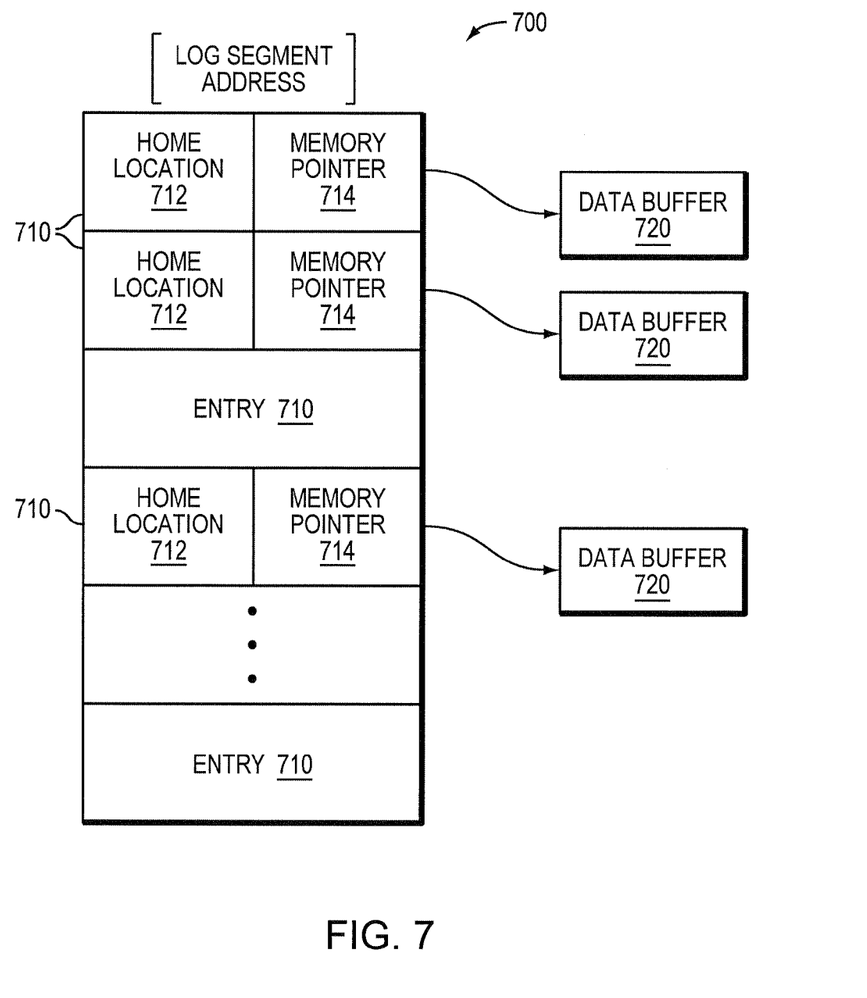
FIG. 7 is a schematic block diagram illustrating organization of a segment descriptor that may be advantageously used with the present invention.

FIG. 7 is a schematic block diagram illustrating the organization of a segment descriptor 700 that may be advantageously used with the present invention. The segment descriptor is illustratively embodied as an array having a plurality of (e.g., 64) entries 710, wherein each entry comprises a home location 712 and a memory pointer 714 that references a data buffer 720, e.g., a 4 kB block of data, in the write buffer 600. As noted, each segment descriptor 700 of a zone log 620 points to an active log segment 610 in the write buffer 600 that represents a corresponding log segment 500 of the log; accordingly, the segment descriptor has an associated (log segment) address of the corresponding log segment in the log 400. The segment descriptors 700 are used in connection with the improved sorting procedure described further herein.

Since the size of each active log segment 610 is approximately 256 kB (sixty-four 4 kB log buffers) and since, illustratively, there are 256 active log segments, one for each zone log 620, the write buffer 600 illustratively comprises at least 64 MB of storage space in the non-volatile memory 140. In other words, a portion of the non-volatile memory, e.g., 64 MB, is used as the write buffer to temporarily hold (stage) the write data as it arrives at the storage system, before it is written to the log 400. Data written to the active log segments 610 is generally not moved from the write buffer 600 to the disk-based log 400 until the segments are full. To prepare for the final return of the data to their home locations in array 300, the log manager 900 illustratively processes collections of segments 610 to establish a level of shared locality, as described further herein in accordance with the improved sorting procedure. It should be noted that the write buffer 600 may be up to twice as large in order to allow continued writes to zone logs after the associated active log segment has filled, but before the segment has been written to disk.

Index

FIG. 8 is a schematic block diagram illustrating organization of the index 800 that may be advantageously used with the present invention. The index 800 is illustratively embodied as a sorted data structure, such as a hash table or, as described herein, a balanced tree (B-tree), in the non-volatile memory 140 and is configured to provide mappings from home addresses (HA) on the home location array 300 to log buffer addresses (log addresses, LA) on the disk-based log 400. The index 800 also contains the addresses of the write data in the write buffer 600. Upon receiving a write request, the log manager 900 stores the write data associated with the request in an active log segment 610 of the write buffer 600 and records its log address (LA) in the B-tree indexed by the home address (HA) specified in the request. The home address (HA) is therefore used as a key to index into the B-tree. If another write request arrives for the same home address, a new log address is assigned and the B-tree mapping is updated. Here, the B-tree is traversed using the same home address as the key and the "old" log address is updated to a "new" log address.

Upon receiving a read request at the storage system, the log manager 900 consults the B-tree index 800 to determine whether the most recent data is located in the write buffer 600, as well as whether there are any logged data blocks (i.e., logged data) pertaining to the request. That is, all incoming read requests are directed to the index 800 of the non-volatile memory 140 to determine whether the data in the home location array is valid. If so, the data is read from the home location array 300. Otherwise, the data (i.e., the logged data) is read from the disk-based log 400 or, if appropriate, from the write buffer 600. This aspect of the invention is concerned with correctness of the data and the desire to find the most recently written data. As described herein, the storage system 120 may choose to rehome data as a side effect of a read request.

Disk-Based Sort Procedure

Figure 9:
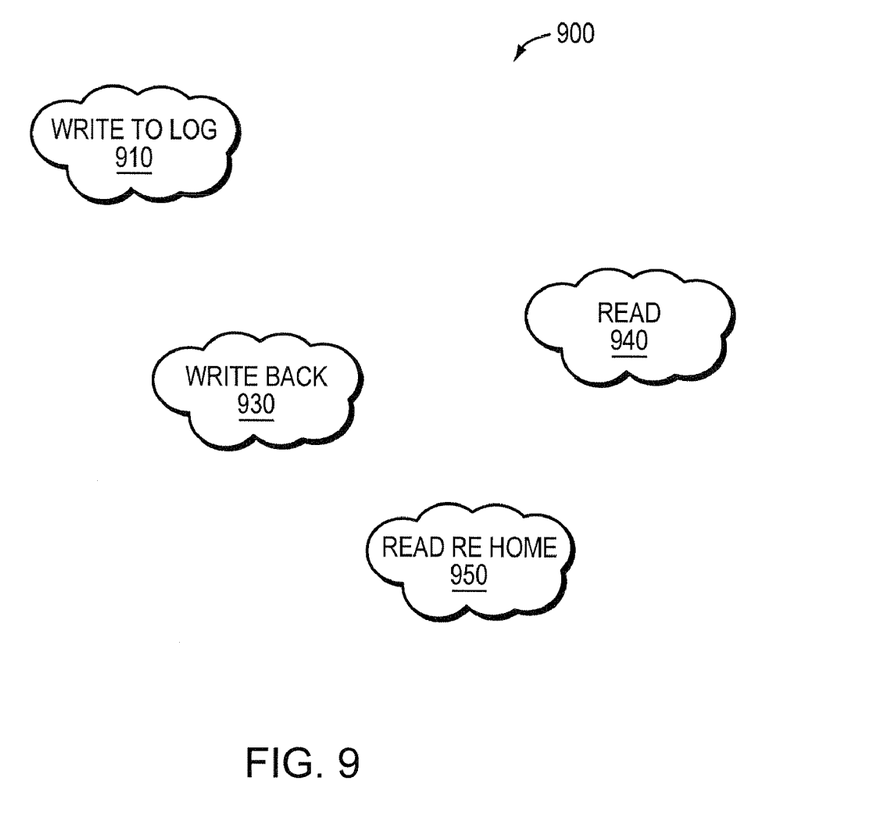
FIG. 9 is a schematic block diagram illustrating various processes of a log manager that may be advantageously used with the present invention.

The present invention is directed to an improved system and method for enhancing performance of updates to sequential block storage of a storage system. A disk-based sort procedure is provided to establish locality among updates (write data) held in the disk-based log 400, thereby enabling the write data to be efficiently written to home locations on home location array 300. As the write data is received, the log manager 900 of the storage system temporarily stores the data efficiently on the disk-based log 400. As more write data arrives, the log manager sorts the data in the log in accordance with the sort procedure, thus increasing the locality of data when stored on the home location array 300. When the log approaches capacity, the log manager writes the sorted data to their home locations on the array with high locality and performance.

FIG. 9 is a schematic block diagram illustrating various processes of the log manager 900 that may be advantageously used with the present invention. In the illustrative embodiment, the log manager comprises four processes: WriteToLog 910, WriteBack 930, Read 940 and ReadReHome 950. The WriteToLog process 910 is invoked by the log manager 900 to accept incoming requests to write new data to home addresses in the home location array 300. To that end, the WriteToLog process 910 illustratively maintains 256 active log segments 610, each of which can store 64 log buffers (data blocks).

Specifically, as each incoming write request issued by a client 110 arrives at the write buffer 600, the log manager 900 assigns the write data of the request to a data buffer 720 and then invokes the improved sort procedure to sort the data into the active log segments 610 by assigning it to the zone log associated with the zone that contains the block's home location address 514. That is, based on the zone that contains the block's home location address 514, the log manager 900 selects a segment descriptor 700 and inserts the incoming write request into an available entry 710. The log manager 900 then inserts the home location address of the write request into the home location field 712 of the entry 710 and sets the memory pointer 714 to the write buffer address of the data buffer 720.

As noted, the segment descriptor 700 has a corresponding "base" log segment address; the log address that is mapped to a particular home location address is that base log segment address plus an offset reflecting the position of the entry 710 within the segment descriptor. For example, assume the log segment address of the segment descriptor is "100" and the incoming write request is assigned to the entry "5" of the segment descriptor. Accordingly, the log address that is mapped to the home location address is "105". The log manager 900 records the mapping from home location address to log address in the index 800 by performing, e.g., an "insert B-tree" operation that inserts log address 105 into a B-tree leaf mapped to the home location address of the incoming write request. The log manager 900 then generates a successful acknowledgement to the write request that is returned to the client 110.

When an active log segment 610 fills (as manifested by completed entries 710 of the corresponding segment descriptor 700), the WriteToLog process 910 flushes the segment to the disk-based log 400 and informs the log manager 900 that a new segment has been added to the zone log 620 corresponding to the zone that contains the home locations. That is, the WriteToLog process 910 cooperates with the disk driver layer 230 to convert the entries 710 to "scatter-gather" I/O operations, e.g., disk write operations, which include the home location addresses 514 of the write data in the data buffers 720. The data is thus written to a corresponding log segment 500 on the disk-based log 400. The WriteToLog process 910 then notifies the log manager 900 that the log segment has been added to a zone log 620 (maintained in write buffer 600). The log manager 900 allocates a new active log segment, e.g., having a new corresponding log segment address (to replace the "old" log segment flushed to log) from a "free" active log segment pool so that it may continue retiring new incoming write requests received from the clients.

The WriteBack process 930 is invoked by the log manager 900 in response to one of a plurality of events: (i) low space within the disk-based log 400, (ii) low space within the index 800, and/or (iii) a sufficient amount of data in the write buffer 600 and/or the log 400 for a particular zone (or stripe) to render an efficient write-in-place operation to the home location array 300. Once triggered by an event, the WriteBack process 930 writes the data from the log 400 to the home location array 300. Illustratively, the WriteBack process 930 chooses the zone log 620 with the highest number of log segments 500 and loads all of their disk blocks/buffers into a writeback buffer (not shown). The log addresses of the disk blocks are compared with the mappings of the index 800 to assure validity. Stale data is discarded and the remaining set of blocks is forwarded to the disk storage layer 220 (e.g., the RAID system) to write efficiently to the disk array 135.

It should be noted that, in an illustrative embodiment, the size of the zone log is limited by the number of log entries that is efficient to process, since the zone log should be processed in its entirety. The size of the zones should also be limited to prevent the size of the associated zone logs from growing too large.

Illustratively, the WriteBack process 930 forwards (to the RAID system) disk blocks having addresses that share a zone and, therefore, individual stripes within a zone. By collectively processing all blocks to be written to a stripe or group of nearby stripes, the RAID system is able to write the data out efficiently. For example, a conventional RAID environment multiplies the random write load on a disk substantially, e.g., 4-6 times (×). The inventive technique described herein, however, can drive the amortized cost of a random write operation below mirroring (2×) and even below a typical random write (1×) to a single disk in a RAID protected array. Note that the data is essentially written "in-place" (as opposed to "anywhere") on disk. Once the log buffers/disk blocks are no longer in the log 400 but have been returned to their home disk locations, the log addresses of those buffers are removed from the index 800 and the log segments are returned to the log segment pool.

The Read process 940 is invoked by the log manager 900 to respond to incoming read requests. Each read request specifies a data block (e.g., a 4 kB block of data) to read. If the requested block is not in the write buffer 600, the Read process 940 uses the home location address of the requested block to index into the B-tree to thereby determine whether there is a corresponding log address. If the B-tree index 800 contains a mapping to a log address, the Read process 940 schedules a read operation, e.g., a disk read operation, to access the data from the log 400. If the index 800 does not contain a mapping for that disk address, the Read process 940 schedules a read operation to access the data from the home location array 300.

The ReadReHome process 950 is invoked by the log manager 900 when, during a sequential read, it is determined that a segment 310 or stripe 320 (in the home location array 300) has a large number of logged blocks. That is, when reading a sequence of home location addresses, the Read process 940 may identify a number of those addresses in the index 800. In such a case, it may be advantageous to return the blocks to their home locations prior to invocation of the WriteBack process 930. For example, assume a sequential read is defined as reading an entire segment 310 within a stripe 320. For purposes of the invention, if more than three (3) logged blocks are found during the sequential read, then ReadReHome 950 is invoked to return those blocks to the home location array 300. It should be noted, however, that other algorithms may be appropriate based on properties of the disk system and applicable workloads.

Accordingly, the ReadReHome process 950 is invoked to return those blocks to the home location array 300 before the WriteBack process is invoked. To that end, the ReadReHome process passes the necessary buffers to the RAID system to write the data to the home location array 300. When the write completes, the ReadReHome process 950 removes the corresponding mappings from the index 800. Note that once the mappings are removed from the index, if an attempt is made to subsequently invoke the WriteBack process, the process will discover that the log buffers are invalid and, thus, will ignore them.

Figure 10:
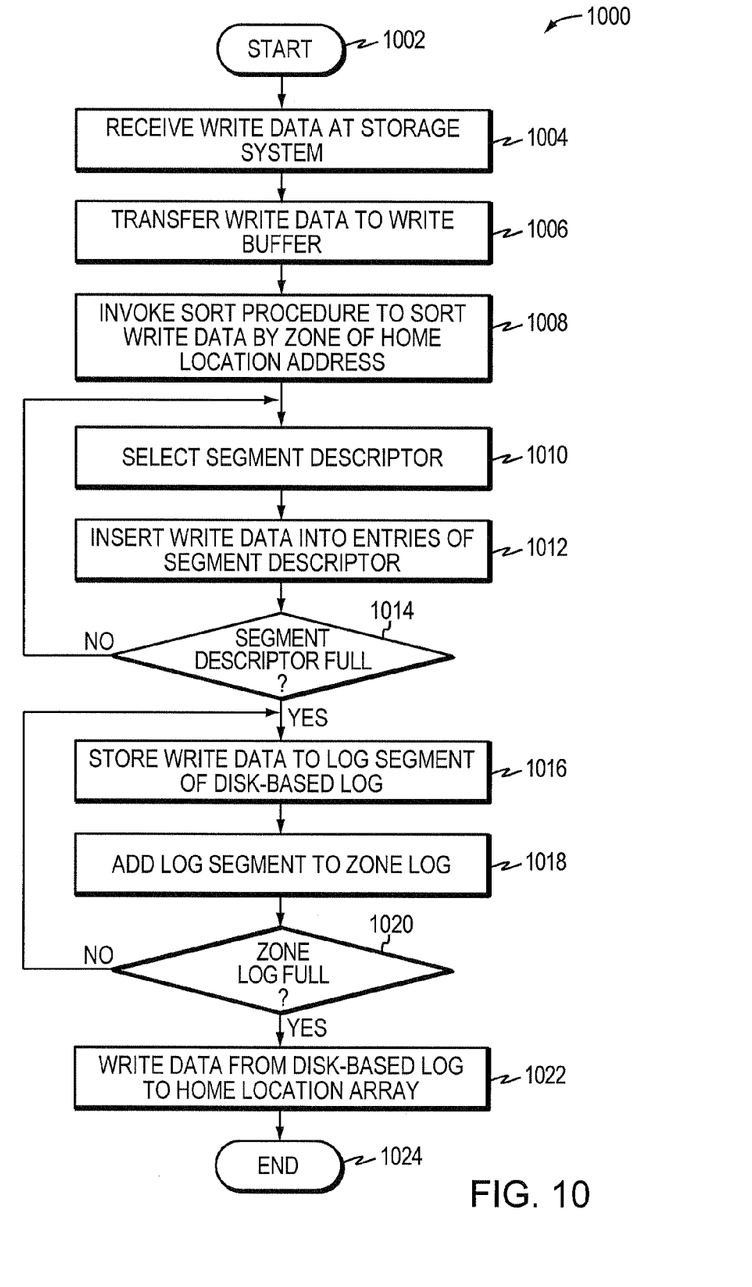
FIG. 10 is a flowchart illustrating an exemplary procedure for enhancing performance of updates to sequential block storage of a storage system in accordance with the present invention.

FIG. 10 is a flowchart illustrating an exemplary procedure for enhancing performance of updates to sequential block storage of a storage system in accordance with the present invention. The procedure 1000 starts at Step 1002 and proceeds to Step 1004 where write data associated with write requests issued by one or more clients are received at the network adapter of the storage system and, in Step 1006, transferred to a staging area (write buffer) of the storage system. In Step 1008, the log manager invokes the improved sort procedure to sort the data by the zone that contains the home location addresses. Based on the zone, the log manager selects a segment descriptor in Step 1010 and inserts the incoming write data into available entries of the descriptor in Step 1012.

In Step 1014, a determination is made as to whether the segment descriptor is full. If not, the procedure returns to Step 1010. However, if the segment descriptor is full, the procedure proceeds to Step 1016 where the WriteToLog process flushes (stores) the data of the segment descriptor to a corresponding log segment on the disk-based log and, in Step 1018, informs the log manager that a new segment has been added to a zone log corresponding to the zone that contains the home location. In Step 1020, a determination is made as to whether the zone log is full, i.e., with a predetermined number of log segments. If not, the procedure returns to Step 1016. Otherwise, the procedure proceeds to Step 1022 where the WriteBack process is triggered to write the data from the log to the home location array. The procedure then ends at Step 1024.

Advantageously, the present invention eliminates the cost associated with maintaining large write buffers in a storage system by providing a disk-based log. The invention further employs a disk-based sorting procedure that sorts blocks of data held in the log prior to returning them to their home locations, thereby substantially improving locality of disk access and, therefore, disk update performance efficiency compared to conventional static disk arrays. Notably, a goal of the invention is to achieve RAID efficiency through implementation of the improved sort procedure in a manner that enables sorting of write data onto zones 330 (rather than stripes) of the home location array 300. Accordingly, the improved sort procedure is implemented with a single level of address sorting to enable such locality while also reducing resource consumption in the storage system 120. That is, the invention reduces both the size of the index 800 that must be maintained as well as the amount of non-volatile memory 140 needed in the system 120. Note that, in an illustrative embodiment, the entire index 800 resides in non-volatile memory 140.

While there have been shown and described illustrative embodiments for enhancing performance of updates to sequential block storage of a storage system, it is to be understood that various other adaptations and modifications may be made within the spirit and scope of the present invention. For example, in an illustrative embodiment described herein, the disk-based log is implemented on disks of the disk array. However, in alternative embodiments of the invention, the log may be implemented in other technologies, such as, e.g., FLASH memory technology, as long as the implementation is economical. Note that a key insight of the invention involves gathering up enough locality among the disk blocks so that write-in-place on the home location array is substantially efficient.

In addition, it should be noted that the performance benefit of write buffering increases with the size of the write buffer, but due to the physical characteristics of disks, the benefit is not uniform. To transfer a set of blocks stored on different disk tracks, the disk must seek between each transfer. In practice, this limits the number of transfers that can be achieved per disk revolution to three or four. When transfers are dense enough that several transfers can be scheduled against a single track, however, such physical limits disappear, and a disk can transfer as many blocks in a revolution as there are blocks in a track. It is, therefore, particularly advantageous to be able to buffer enough random write operations (writes) to achieve an average transfer density of five or more disk blocks per disk track.

According to the present invention, segment sizes can be chosen so that writes to a single segment always lie within a single disk track. With dual parity RAID and a stripe width of 8 disks, each random write implies three disk read operations (reads) and three disk writes to a single stripe. If the log is large enough to contain two buffered writes per segment for each disk in a stripe, the average number of disk operations per block across the stripe will be approximately one. With a segment size of 512 kB and a block size of 4 kB, this density can be achieved with 8 kB of log storage per segment, implying log storage of 1.56% of disk storage space. Beyond that point, write performance is proportional to log size for a broad range of log sizes. The point at which performance increases linearly with log size will generally depend on the level of data protection, the size of disk tracks, and the size of data blocks.

Notably, the disk-based log described herein makes such a large write buffer feasible. A log of 1.56% disk space stored in non-volatile memory would more than double the cost of the storage system, thus eliminating any price-performance advantage gained by improved disk performance.

The foregoing description has been directed to specific embodiments of this invention. It will be apparent, however, that other variations and modifications may be made to the described embodiments, with the attainment of some or all of their advantages. For instance, it is expressly contemplated that the processes and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   transferring updates received at a storage system to a write buffer of the storage system, the updates comprising write data;
   invoking a single-level sort procedure to sort the write data by a zone of a home location address of the write data;
   storing the sorted write data on a log of the storage system; and
   invoking an event to trigger write back of the sorted write data from the log to a home location array of the storage system.

2. The method of claim 1 further comprising:
   organizing the log and the home location array on an array having one or more storage devices.

3. The method of claim 2 further wherein storing the sorted write data comprises:
   storing the sorted write data to a zone log on the log.

4. The method of claim 1 further comprising:
   organizing the home location array into disjoint segments of each storage device;
   organizing the segments on the storage devices into stripes; and
   organizing the stripes adjacent to one another into zones.

5. The method of claim 4 wherein invoking the single-level sort procedure comprises:
   sorting the write data onto the zone of the home location array that contains the home location address of the data.

6. The method of claim 4 further comprising:
organizing non-volatile memory of the storage system as an index configured to provide a mapping from the home location address of the write data on the home location array to a log buffer address on the log.

7. The method of claim 6 wherein the event used to trigger write back of the sorted write data comprises a threshold amount of space being left within the log.

8. A system comprising:
an array of a storage system, the array having one or more storage devices organized into a home location array having a set of sequential home locations for blocks, the array further organized into a log having a set of log buffers configured to store versions of the blocks that have yet to be returned to their home locations in the home location array;
a non-volatile memory of the storage system, the non-volatile memory providing a temporary, persistent storage space capable of maintaining write data associated with the blocks in light of a failure to the storage system, the non-volatile memory further organized into a write buffer having memory data structures used to manage the log; and
a log manager configured to manage the log and the temporary, persistent storage space of the non-volatile memory, the log manager further configured to implement a single-level sort procedure to sort the write data by a zone of a home location address of the write data and to store the sorted write data to a zone log on the log.

9. The system of claim 8 wherein the home location array is organized into disjoint segments of each storage device, the segments of the storage devices are organized into stripes and stripes adjacent to one another are organized into zones.

10. The system of claim 9 wherein the log contains multiple blocks to be written to each segment in a stripe.

11. The system of claim 9 wherein the log manager implements the sort procedure to sort the write data onto the zone of the home location array that contains the home location address of the data.

12. The system of claim 9 wherein the non-volatile memory is further organized as an index configured to provide a mapping from the home location address of the write data on the home location array to a log buffer address on the log.

13. The system of claim 12 wherein the log manager comprises a writeback process that is invoked by at least one event to trigger write back of the sorted write data from the log to the home location array.

14. The system of claim 13 wherein the at least one event comprises a threshold amount of space being left within the log.

15. The system of claim 13 wherein the at least one event comprises a threshold amount of space being left within the index.

16. The system of claim 13 wherein the at least one event comprises an amount of data in one of the write buffer and the log for one of a particular zone and stripe, to render a write-in-place operation to the home location array.

17. A method comprising:
transferring updates received at a storage system to a write buffer of the storage system, the updates comprising write data;
invoking a single-level sort procedure to sort the write data by a home location address of the write data;
storing the sorted write data on a log of the storage system;
invoking at least one event to trigger write back of the sorted write data from the log to a home location array of the storage system, the home location array organized into zones; and
sorting the sorted write data onto the zones to achieve close physical locality of the write data onto the home location array.

18. The method of claim 17 further comprising:
implementing the log on storage devices of the storage system.

19. The method of claim 17 further comprising:
implementing the log on flash memory of the storage system.

* * * * *